US010634332B2

(12) United States Patent
Draaijer et al.

(10) Patent No.: US 10,634,332 B2
(45) Date of Patent: Apr. 28, 2020

(54) LIGHT POLE

(71) Applicant: SIGNIFY HOLDING B.V., Eindhoven (NL)

(72) Inventors: Maurice Herman Johan Draaijer, Ittervoort (NL); Kumar Arulandu, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/695,111

(22) Filed: Sep. 5, 2017

(65) Prior Publication Data
US 2018/0066833 A1 Mar. 8, 2018

(30) Foreign Application Priority Data

Sep. 5, 2016 (EP) ..................................... 16187157

(51) Int. Cl.
*F21V 23/04* (2006.01)
*F21V 23/02* (2006.01)
*H05B 37/02* (2006.01)
*F21S 8/08* (2006.01)
*H05B 33/08* (2020.01)
(Continued)

(52) U.S. Cl.
CPC ............ *F21V 23/045* (2013.01); *F21K 9/278* (2016.08); *F21S 8/086* (2013.01); *F21V 23/004* (2013.01); *F21V 23/02* (2013.01); *F21V 23/0435* (2013.01); *H02J 50/10* (2016.02); *H05B 33/0815* (2013.01); *H05B 37/0272* (2013.01); *F21W 2111/02* (2013.01); *F21W 2131/103* (2013.01); *H01F 38/14* (2013.01); *H02J 7/025* (2013.01); *H05B 37/0227* (2013.01); *Y02B 20/346* (2013.01)

(58) Field of Classification Search
None
See application file for complete search history.

(56) References Cited

U.S. PATENT DOCUMENTS 6,040,986 A    3/2000 Sakamoto et al.
2007/0109142 A1*  5/2007 McCollough, Jr. .... G08B 21/12
                                                    340/641

(Continued)

FOREIGN PATENT DOCUMENTS

DE   102013222889 A1   5/2015
WO      2011057343 A1   5/2011
(Continued)

*Primary Examiner* — Elmito Breval
(74) *Attorney, Agent, or Firm* — Meenakshy Chakravorty (57) ABSTRACT

The disclosure relates to an apparatus comprising a pole such as a light pole, and one or more removable modules adapted to be removably fitted to the pole. The apparatus further comprises, included in the lighting module or another of the modules, a controller comprising a wireless receiver for wirelessly receiving on-off signals from a remote control system. An inductive coupling between a primary winding in the light pole and a secondary winding in the lighting module is used to transfer power from a power supply of the pole to at least one of the removable modules, in order to power an element of that module. Further, a magnetic coupling is used to enable the controller to control a switch in the pole in order to connect and disconnect the primary winding to and from the power supply.

14 Claims, 4 Drawing Sheets

(51) Int. Cl.
    *H02J 50/10*      (2016.01)
    *F21K 9/278*     (2016.01)
    *F21V 23/00*     (2015.01)
    H01F 38/14     (2006.01)
    H02J 7/02      (2016.01)
    F21W 111/02   (2006.01)
    F21W 131/103  (2006.01)

(56) References Cited

U.S. PATENT DOCUMENTS

| | | | |
|---|---|---|---|
| 2009/0009093 | A1 | 1/2009 | Vernondier et al. |
| 2010/0207771 | A1 | 8/2010 | Trigiani |
| 2011/0210684 | A1 | 9/2011 | Lanchava et al. |
| 2014/0306546 | A1 | 10/2014 | Jansen et al. |
| 2016/0131358 | A1* | 5/2016 | Spiro ................. H04W 88/08 455/561 |
| 2018/0045388 | A1* | 2/2018 | McDowell ............. F21V 29/15 |
| 2018/0368208 | A1* | 12/2018 | Yang .................... H04W 88/08 |

FOREIGN PATENT DOCUMENTS

| | | |
|---|---|---|
| WO | 2013115721 A1 | 8/2013 |
| WO | 2016134992 A1 | 9/2016 |

* cited by examiner

LIGHT POLE

TECHNICAL FIELD

The present disclosure relates to a light pole and a wireless receiver circuit for remotely controlling the light pole.

BACKGROUND

The typical lifetimes of light poles and their lamps are thirty years and ten years respectively. During the lifetime of a light pole, the individual components such as the fixture, lamp, and lamp gear require multiple manual servicing activities, which is quite costly due to closing down the street and getting a technician within the reach of the fixture (i.e. the removable luminaire module). Today, most of current light poles still consist of gas discharge lamps that need to be replaced on average every three years. Cleaning of the reflector and the optical window of the fixture also happens during the lamp replacement process. Maintenance of outdoor lighting is labour-intensive as the lighting fixtures need to be accessed at a height above the road. This means at least a part of the street needs to be closed down and a technician needs to be brought within the reach of the lamp. In most countries two people are required to perform such an action because of safety procedures.

Another type of light pole that is beginning to penetrate the outdoor lighting market is the LED-based light pole, which employs an LED-based lamp comprising an array of LEDs instead of a gas discharge lamp. LED-based light poles have increased lifetime and reduce the need for maintenance. The LED-based light source lasts at least as long as the driver of the light source. This results in less maintenance and can even eliminate the need for full replacement of the lighting fixture during maintenance. With the advantage of low maintenance, LED-based lighting fixtures could therefore include the driver and become "sealed for life" products. The light post itself usually has a lifetime of approximately 30years as it only contains electrical wiring and robust passive components such as a fuse and wiring.

However, there is also a trend for outdoor lighting systems to become more intelligent by incorporating sensors and/or connection to a communication network such as the Internet. For instance, any of a large variety of sensors such as a photocell, camera and/or GPS unit can be incorporated into a component of a light pole. Further, in the age of connectivity and the "Internet of things" (IoT), more and more light poles can also be equipped with a wireless communication unit such as a GPRS receiver or transceiver, allowing the light pole to be monitored and/or controlled remotely through the Internet. As big data and the IoT grow rapidly, the value of collecting data is becoming evident. Intelligent light poles are very attractive as hosts for third party sensors and communications because the light poles can provide power and access to the Internet.

One issue is that the economic lifetime of these communication modules and sensors is typically far less compared to the lifetime of LED lighting systems, and hence will need more frequent replacements. For instance for IoT applications, the economic lifetime of the IoT products is far less compared to the technical lifetime, which means these devices require more frequent replacement or upgrades. Hence although LED-based lighting is reducing the need for maintenance, the trend for sensor and communication functionality goes against this in that the light pole will need more frequent physical access to the light pole head for maintenance or upgrades. Without taking further measures, this means increased replacement and maintenance costs for outdoor lighting systems that enable IoT services or the like. Depending on the environment, servicing and/or replacing parts can be more costly than the parts themselves. In some cases, the cost of the parts is even negligible compared to the cost and effort required to service and/or replace parts.

SUMMARY

Simplifying and/or automating such maintenance activities would therefore be beneficial. However it is recognized herein that the interface between the pole and the removable lighting fixture is currently realized by a wired connection, and therefore not labour friendly. Accordingly, the present invention provides a wireless power and communication interface including an electromagnetic interface that simplifies replacement of a lighting module, communication module and/or sensor module, and thereby simplifies replacement of such a module on a light pole, or indeed another type of structure such as a signpost. This advantageously decreases maintenance effort and therefore cost. For instance, the simplified interface facilitates the replacement to be for example performed autonomously by a robot.

According to one aspect disclosed herein, there is provided apparatus comprising: a pole affixed to the ground, comprising a module-mounting part; and one or more removable modules adapted to be removably fitted to the module-mounting part of the pole. The module-mounting part of the pole comprises at least one primary winding of an inductive coupling circuit, the primary winding being connected to a power supply (e.g. a mains power supply) via a switch. At least one of the modules (e.g. a lighting module or sensor module) comprises a secondary winding of the inductive coupling circuit, the secondary winding sharing a substantially same flux than the primary winding when said at least one removable module is in place in the module-mounting part (i.e. forming an inductive coupling sufficient to power at least one component of the at least one module). In addition the apparatus further comprises a controller included in one of the one or more removable modules (which may be the same module as said at least one module or a different module): The controller comprises a wireless receiver for wirelessly receiving on-off signals from a remote control system; and the controller further comprises magnetic coupling circuitry arranged so as when fitted to the module-mounting part of the pole to form a magnetic coupling with the switch, and to thereby switch the switch on and off in accordance with the on-off signals. When the removable part in positioned inside the module mounting part, the optimisation of the energy transfer depend of the electromagnetic coupling between the primary and the secondary windings. Even if it is not possible that exactly the same flux crosses the two windings, it will be substantially the same with a difference corresponding to the losses of the transformer.

In embodiments, the pole is a light pole. In particular embodiments of this, said at least one removable module may comprise a lighting module comprising an illumination source for emitting illumination to illuminate at least part of an environment of the light pole, in which case the secondary winding is connected to the illumination source such that said inductive coupling powers the illumination source to emit said illumination.

Alternatively or additionally however, the at least one module may comprise a sensor module comprising a sensor, the secondary winding being connected to the sensor such that said inductive coupling powers the sensor. E.g. the sensor module may be a camera module comprising a sensor in the form of one or more cameras.

In embodiments, the controller may be arranged to be powered at least in part by the power supply of the pole via the inductive coupling circuitry.

In embodiments, the controller may be arranged to be powered to perform said receiving and switching at least in part by the same inductive coupling between the same primary winding and the same secondary winding which powers the illumination source.

Such embodiments are particularly advantageous in terms of simplifying the interface with the pole, in that they require only a single inductive power connection to the pole's power supply.

In embodiments, the controller may be incorporated as an integral part of the lighting module.

However, alternatively the controller may be implemented in a removable and replaceable module adapted to fit to the lighting module, being removable and replaceable while the lighting module remains fitted to the pole (i.e. the controller is implemented in a replaceable sub-module of the lighting module).

Or as another alternative, in embodiments said one or more removable modules may be a plurality of removable modules, and the controller may be implemented in a separate one of the plurality of removable modules other than the lighting module.

Such embodiments are particularly advantageous in that the module comprising the controller can be replaced or serviced separately from the lighting module. Hence the lighting module does not need to be removed in order to replace or service the controller (or associated components in its module such as a sensor).

There are a number of possible implementations for supplying the power to the controller.

For instance, in embodiments, the inductive coupling circuitry may comprise a plurality of secondary windings, with the secondary winding that transfers the power to said illumination source being a first of said plurality of secondary windings, and the module in which the controller is implemented comprising a second of said secondary windings. The inductive coupling circuitry comprises one or more primary windings including at least the primary winding that transfers the power to said illumination source. In such embodiments the controller may be arranged to be powered to perform said receiving and switching at least in part by an inductive coupling between one of the one or more primary windings and the second secondary windings.

In embodiments, the one or more primary windings may be a plurality of primary windings, with the primary winding that transfers the power to said illumination source being a first of the plurality of primary windings, and the plurality of primary windings further comprising a second primary winding. In such embodiments, the controller may be arranged to be powered to perform said receiving and switching at least in part by an inductive coupling between the second primary winding and the second secondary winding.

In embodiments, the second secondary winding may be incorporated in said separate module.

In embodiments, the second primary winding may also be connected to the power supply of the pole via said switch, such that the controller is isolated from the power supply of the pole by the switch being switched off.

In embodiments, a number of methods can advantageously be used to power the controller even when the switch is turned off.

For instance, in embodiments the pole may comprise an impedance (e.g. a capacitor) connected in parallel with the switch, and the controller may be arranged to be powered to perform said receiving and switching when the switch is switched off at least in part by a leakage current due to the impedance.

Alternatively or additionally, the module in which the controller is implemented may comprise a battery arranged to be charged by the power supply of the pole via the inductive coupling circuitry when the switch is switched on, with the controller being arranged to be powered to perform said receiving and switching at least in part by the battery when the switch is switched off.

Alternatively or additionally, the module in which the controller is implemented may comprise one or more photovoltaic cells, with the controller being arranged to be powered to perform said receiving and switching at least in part by the one or more photovoltaic cells when the switch is switched off.

Alternatively or additionally, the module in which the controller is implemented may comprise a kinetic energy harvesting device, and the controller may be arranged to be powered to perform said receiving and switching at least in part by the kinetic energy harvesting device when the switch is switched off.

In other embodiments, the second primary winding may not be disconnected from the power supply of the pole by said switch being switched off, such that the controller is arranged to be powered to perform said receiving and switching when the switch is switched off at least in part by the power supply of the pole via the inductive coupling between the second primary winding and the second secondary winding.

In particular embodiments of this, the module-mounting part of the pole may comprise an additional switch connecting the second primary winding to the power supply of the pole, such that the controller is isolated from the power supply of the pole by the additional switch being switched off. In such embodiments, the module in which the controller is implemented may comprise further magnetic coupling circuitry arranged so as when fitted to the module-mounting part of the pole to form a magnetically coupling to the additional switch. Further, the module in which the controller is implemented may comprise a battery arranged to be charged by the power supply of the pole via the inductive coupling between the second primary coil and the second secondary winding when the additional switch is switched on, with the controller being configured to be powered to perform said receiving and switching at least in part by the battery when the additional switch is switched off In addition, the module in which the controller is implemented may comprise a battery level meter arranged to measure a battery level of the battery; and the controller may further comprise logic configured to operate the further magnetic coupling circuitry to automatically switch the additional switch on to charge the battery when the detected battery level is below a threshold, and to automatically switch the additional switch off when the battery level is detected to be above a threshold (which could be the same as the threshold used to turn the switch on, or a different threshold).

In embodiments, the controller may further comprise at least one sensor arranged to take a sensor reading and a wireless transmitter arranged to wirelessly transmit the sensor reading to the control system. The controller may be powered to perform the sensing and transmitting by any of the above-mentioned means. E.g. the sensor may comprise an ambient light sensor and the sensor reading may comprise a measure of the ambient light in the environment of the pole, or the sensor may comprise a camera and the sensor reading may comprise a still or video image of at least part of the environment of the pole, or the sensor may comprise a temperature sensor and the sensor reading may comprise a measurement of an operating temperature of a component of the pole or lighting module.

According to another aspect disclosed herein, there is provided apparatus comprising: a structure such as a light pole comprising a module-mounting part; and one or more removable modules adapted to be removably fitted to the module-mounting part of the structure; wherein the module-mounting part of the structure comprises at least one primary winding of an inductive coupling circuit, the primary winding being connected to a power supply via a switch; wherein at least one of the removable modules comprises a secondary winding of the inductive coupling circuit, the secondary winding being arranged such that when said at least one module is fitted to the module-mounting part of the structure and the switch is switched on, but not when the switch is switched off, the secondary winding forms an inductive coupling with the primary winding and thereby transfers power from the power supply to the at least one module; wherein the apparatus further comprises, included in one of the one or more removable modules, a controller comprising a wireless receiver for wirelessly receiving on-off signals from a remote control system; and wherein the controller further comprises magnetic coupling circuitry arranged so as when fitted to the module-mounting part of the structure to form a magnetic coupling with the switch and to thereby switch the switch on and off in accordance with the on-off signals. In embodiments the structure may be affixed opt the ground. In embodiments the structure may be take the form of a pole such as a light pole. In embodiments this apparatus may be further configured in accordance with any of the apparatus features disclosed above.

According to another aspect disclosed herein, there may be provided a method of replacing the controller, wherein the method comprises using a robot to replace the module in which the controller is implemented.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

As discussed previously, it would be desirable to simplify the interface between a light pole and a module having communications capability, so as to simplify maintenance activities and even allow for automation of the replacement of a module. Robots today have the capability to climb poles, and also to manipulate objects such as to replacement components as part of a maintenance operation. Hence robots and would be cable of performing simple replacement tasks such as replacing the lighting fixture and/or other such modules on a light pole, if the interface is simple enough. If components on a light pole can be replaced by robots, this will in turn bring down the cost of replacement and therefore light posts can become an even more attractive, future-proof hub for sensors, communications and/or smart lighting fixtures.

Indeed, using a robot may provide any one or more of a number of advantages. Firstly, as mentioned, it reduces the cost of providing services running on top of lighting systems because IoT device are more easily and quickly deployable. Further, there is lower downtime of lighting and/or services since the system can be fixed faster. Lower downtime of lighting also means higher safety for those who reply on the lighting (e.g. residents of a street), plus the maintenance or replacement operation itself is safer as it does not require a person or people to attend to the light pole head at height. Further, using Robots has lower maintenance cost compared to sending a person to do the work. Further, it enables provision of a flexible hub on light posts for third party equipment, and/or more future proofing for new sensors and communication technologies.

The following describes a wireless power and communication interface that simplifies the interface between a module and a light pole, and thereby simplifies replacement of the module. By means of this interface, the light pole is able to accept a removable part that can be either the lighting fixture itself with embedded intelligent functionality, or another "intelligent" module such as a sensor module, in such a way that the maintenance can be easily performed. For example a robot can climb the light pole and then exchange the removable part.

The system comprises a wireless power transmission unit comprising a primary winding onboard a light pole, along with a magnetically controllable switch (in embodiments with a parallel reactive impedance) in order to alternate between normal operating mode and standby mode. The system further comprises a wirelessly powered removable lighting fixture module that contains a secondary winding for receiving power from the primary transmission coil of the light pole via an inductive power coupling. The light fixture module also comprises a power converter to convert the received power to drive the light source of the lighting fixture, e.g. the LEDs. In embodiments, this may also be used to realize an auxiliary supply. Further, the removable light fixture comprises a controller for acting on control signals to control the primary winding through a second magnetic coupling. The switch enables the controller to cut the power in the primary winding when the light fixture is off in such a way to reduce current consumption. In embodiments, the lighting fixture module may also comprise a docking system for other devices other than a lighting device (e.g. one or more sensors), such that these other devices can also receive power from the light pole via the lighting fixture module via the auxiliary supply. In addition, the data from the docked devices can be passed though the lighting control communication devices (RF, GPRS, GSM etc.) to the Internet.

Figure 1:
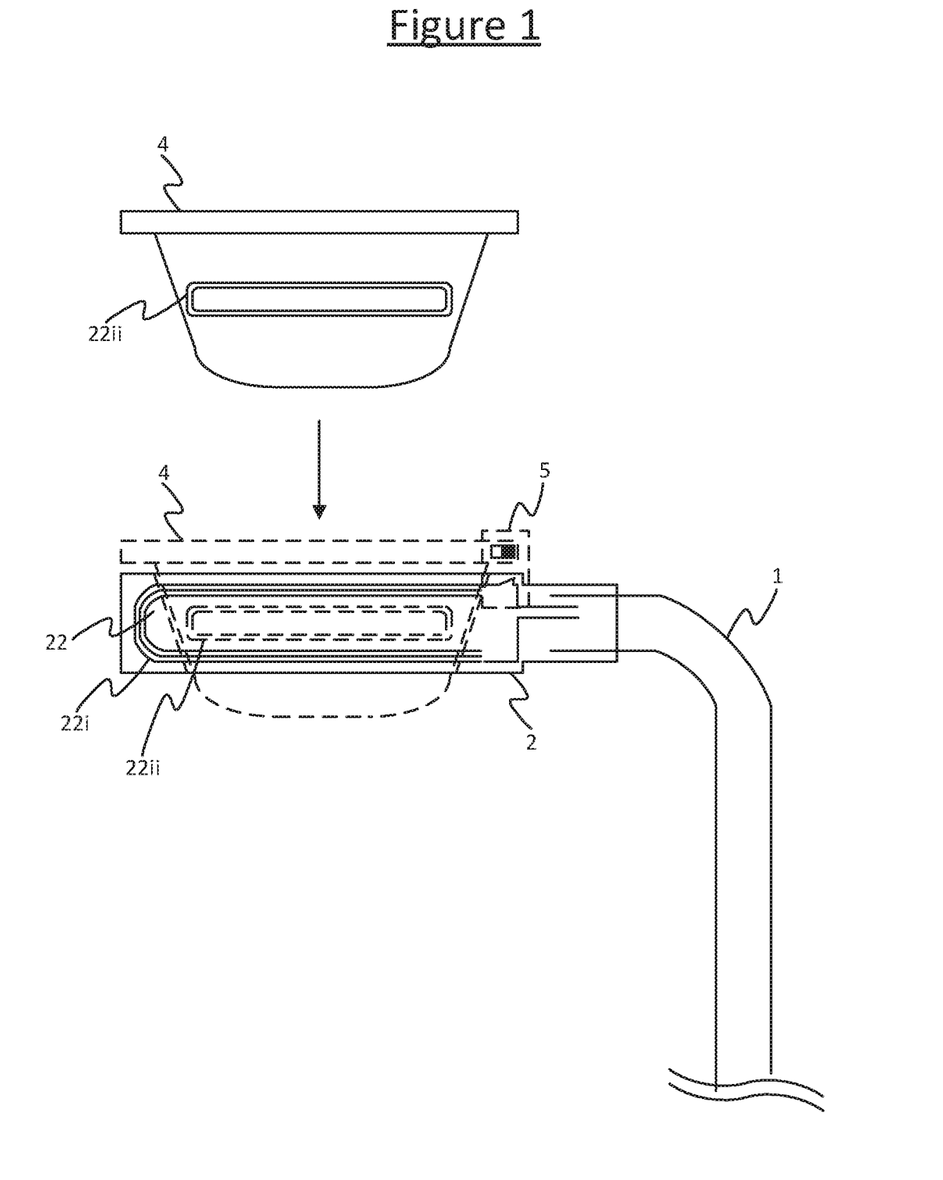
FIG. 1 is a schematic illustration of a light pole with a removable lighting module.
Figure 2:
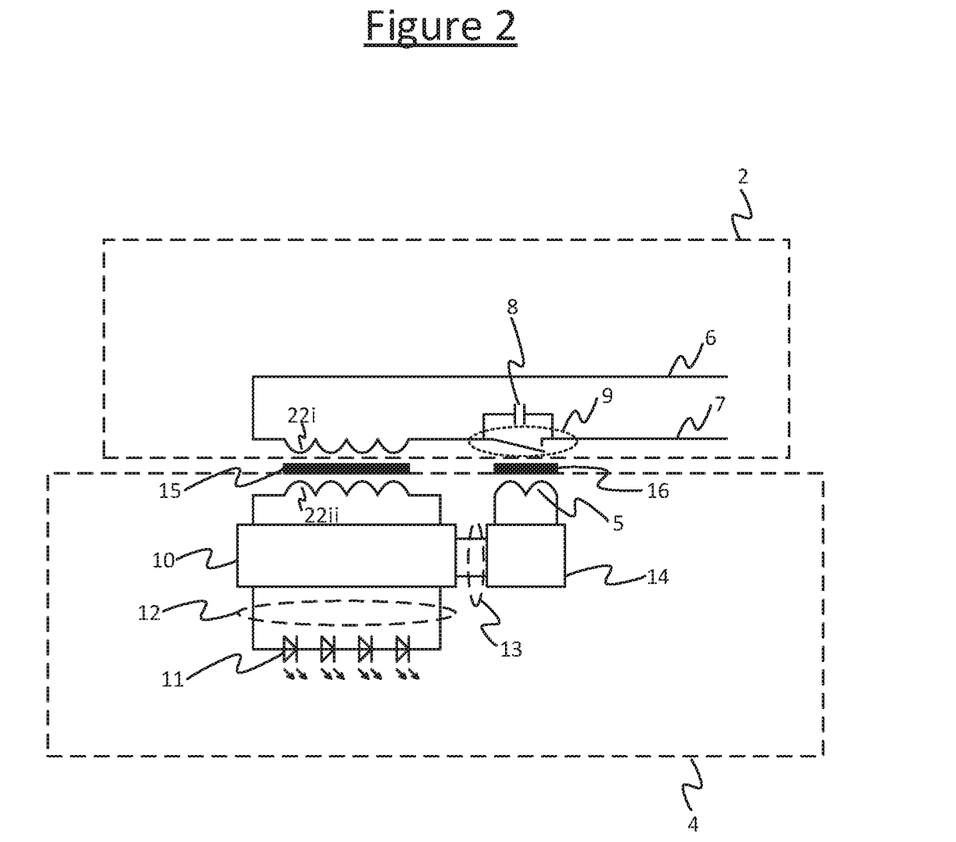
FIG. 2 is a schematic circuit diagram of a circuit for transferring power from a light pole to a removable lighting module.

Some exemplary embodiments are discussed in more detail in relation to FIGS. 1 and 2.

FIG. 1 shows a lighting system comprising a light pole (light post) 1 such as a streetlight or lamppost. The light pole comprises a supporting structure affixed to an anchoring medium, typically the ground (e.g. the earth, floor, road or pavement). Note however that this does not have to be the case in all possible embodiments, and the light pole could be mounted elsewhere.

The light pole 1 comprises a module-accepting part 2, typically the head of the light pole, comprising a connector mechanism into which one or more removable modules can be mechanically connected so as to allow them to be removed and replaced in a modular manner. The one or more removable modules comprise at least an illumination module 4 in the form of a removable lighting fixture for illuminating the surroundings of the light pole, e.g. to illuminate a certain area of the road or street below the luminaire 4 (in the field of outdoor lighting the fixture refers to the removable part that houses the light emitting elements or elements).

Further, in accordance with embodiments of the present disclosure, the light pole 1 and removable illumination module 4 comprise inductive coupling circuitry 22 for transferring power from the light pole 1 to the illumination module 4 when the illumination module 4 is connected into the light pole head 2. The inductive coupling circuitry 22 comprises a primary winding (coil) 22*i* in the light pole head 2 and a secondary winding (coil) 22*ii* in the illumination module 4. The primary coil 22*i* is connected to a power supply (e.g. the mains) via a switch. Further, the inductive coupling circuitry 22 is arranged such that when the illumination module 4 is inserted into the mechanical connector mechanism in the head 2 of the light pole 1, in the manner which it is designed to, and when the switch is closed such that the primary coil 22*i* is energized, then an inductive coupling is formed between the primary and secondary coils 22*i*, 22*ii* so as to transfer power from the power supply to the illumination module 4 in order power the illumination module 4 to emit its illumination.

Moreover, the illumination module 4 comprises magnetic coupling circuitry 5 which is able to magnetically couple to the switch in the light pole head 2, and to thereby toggle the connection of the power supply to the primary coil 22*i*. Thus by means of the magnetic coupling circuitry 5 the powering of the illumination module 4 can be switched on and off.

FIG. 2 shows more detail of an example implementation of the light pole head 2 and the illumination module 4.

The light pole head 2 comprises a wireless power transmitter comprising: the primary winding 22*i*, the switch 9, and optionally an impedance 8. The switch 9 and primary winding (coil) 22*i* are connected in series between a neutral wire 6 and a live wire 7 of the power supply, e.g. the mains connection. The impedance 8, if used, is connected in parallel across the switch 9, and preferably comprises a capacitor (preferably only a capacitor).

The illumination module 4 comprises: the secondary winding 22*ii*, an illumination source 11 in the form of lamp, a power converter 10, and a wireless controller 14 comprising the magnetic coupling circuitry 5. In embodiments the lamp 11 is an LED-based lamp comprising a set of multiple LEDs. Embodiments below may be described as such but it will be appreciated that this is not limiting, and other types of lamp are possible, e.g. more traditional types comprising a filament bulb or a gas discharge lamp.

The secondary winding (coil) 22*ii* is arranged such that, when the illumination module 4 is fitted into the light pole head 2, in the manner it is designed to, then the secondary winding 22*ii* is positioned adjacent to the primary winding 22*i* in the light pole head 2. Furthermore, the magnetic coupling circuitry 5 comprises an electromagnet, comprising another coil, arranged such that when the illumination module 4 is fitted into the light pole head 2 in the manner it is designed to then the electromagnet is positioned adjacent to the switch 9.

With the illumination module 4 so positioned and the switch 9 being closed, this means current from the mains supply 6, 7 is supplied to the primary coil 22i. By means of its proximity to the secondary coil, this forms an indicative coupling 15 which in turn energizes the secondary coil 22*ii*. That is, the primary and secondary coils 22*i*, 22*ii* share a substantially same flux, to a sufficient degree to power at least one component connected to the secondary coil 22*i* on the secondary side of the indicative coupling circuitry 22. Particularly, in the embodiments of FIG. 2, the power converter 10 is connected to the secondary coil 22*ii* so as to receive at least some of this power, and to convert at least a portion of the received power into an illumination source power supply 12 which it outputs to the lamp 11 in order to power the lamp 11 to emit the illumination. E.g. the power converter uses the received power from the secondary coil 22*ii* to generate an LED power supply 12 for powering the LEDs of the lamp 11. In embodiments, the power converter 10 is also configured to convert another portion of the power received via the secondary coil 22*ii* into an auxiliary power supply 13 for powering the controller 14 including its magnetic coupling circuitry 5, and optionally one or more further components such as one or more sensors (not shown).

The flux shared by the two coils 22*i*, 22*ii* depends on the coupling and on the position of one coil in regard of the other coil, but preferably to achieve the best coupling the total flux of the first coil 22*i* should be substantially the same as that of the second coil 22*ii*.

The switch 9 is a mechanical switch which has an actuator (e.g. arm) which is physically moved in order to open and close the switch 9, and thereby disconnect and connect the primary coil 22*i* to the power from and to the power supply 6, 7. The actuator comprises a magnetisable material. Magnetically controllable switches are in themselves known in the art, and are sometimes referred to as reed relays. Furthermore, when powered, the magnetic coupling circuitry 5 is operable to generate a magnetic field. With the magnetic coupling circuitry 5 also placed in position as described above, this forms a magnetic coupling 16 between the actuator of the switch 9 and the electromagnet of the magnetic coupling circuitry 5. I.e. the magnetic field can be used to move the actuator of the switch 9.

In embodiments the switch 9 is arranged such that the primary coil 22*i* is connected to the power supply 6, 7 when the magnetic field from the magnetic coupling circuity 5 is turned on, and the primary coil 22*i* is disconnected from the power supply 6, 7 when the magnetic field from the magnetic coupling circuity 5 is turned off. Alternative the switch 9 may be arranged such that the primary coil 22*i* is disconnected from the power supply 6, 7 when the magnetic field from the magnetic coupling circuity 5 is turned on, and the primary coil 22*i* is connected to the power supply 6, 7 when the magnetic field from the magnetic coupling circuity 5 is turned off Alternatively the switch 9 may be configured to be stable in both positions, and may be moved by controlling the magnetic coupling circuity 5 to switch between generating a magnetic field in opposite directions. I.e. generating a field in one direction moves the switch 9 to the stable connected position, where it remains after the field is turned off until a field is generated in the other direction moving it to the stable off position (where it remains after this opposite field is turned off until another field is again generated in the first direction, and so forth).

The controller 14 comprises the magnetic coupling circuitry 5, and is thereby arranged to be able to control the magnetic coupling circuity 5 to switch its magnetic field on and off, and in embodiments reverse its direction. This enables the controller 14 to toggle the switch 9 on and off via the magnetic coupling 16.

Note: in the arrangement shown in FIG. 2, the controller 14 (including in embodiments its magnetic coupling circuitry 5) will require a separate power supply to power the controller 14 when the switch 9 is turned off. For example this may be achieved using a battery or a sustainable power supply such as a solar cell. Some examples will be discussed in more detail later. Indeed, in embodiments, the controller 14 need not be powered by the auxiliary power supply 13 derived from the light pole's power supply 6, 7 at all, and may instead be powered entirely by alternative means such as a battery and/or sustainable source.

In embodiments, the controller 14 and its magnetic coupling circuitry 5 may be incorporated as an integral part of the illumination module 4, such that when the illumination module 4 is fitted then the controller 14 is inherently fitted along with it and the magnetic coupling circuitry 5 is positioned in place against the switch 9, and when the illumination module 4 is removed then the controller 14 and magnetic coupling circuitry 5 are inherently removed along with it, and when the illumination module 4 is replaced then the controller 14 and magnetic coupling circuitry 5 are inherently replaced along with it.

Alternatively the controller 14 and its magnetic coupling circuity 5 may be implemented in an attachable and detachable module which docks with the illumination module 4 rather than directly with the light pole head 2. Put another way, the controller 14 and its magnetic coupling circuity 5 may be implemented in a removable and replaceable sub-module of the lighting module 14, which can be removed and replaced independently of the lighting module 14 itself. In this case the connection between the lighting module 4 and the controller 14 will involve a separate electrical connector mechanism, separate to the mechanical connection between the illumination module 4 and the head 2 of the light pole 1. In the case where the controller 14 and magnetic coupling circuitry derive their power from the auxiliary supply 13 generated by the power converter 10 in the illumination module 14, this connection may comprise an electrical power connector for supplying the auxiliary power from the power converter 10 to the controller 14 and magnetic coupling circuitry 15. Or this auxiliary power interface 13 could even be transferred by another inductive coupling (not shown) between the illumination module 14 and the sub module housing the controller 14 and magnetic coupling circuitry 5.

Figure 3:
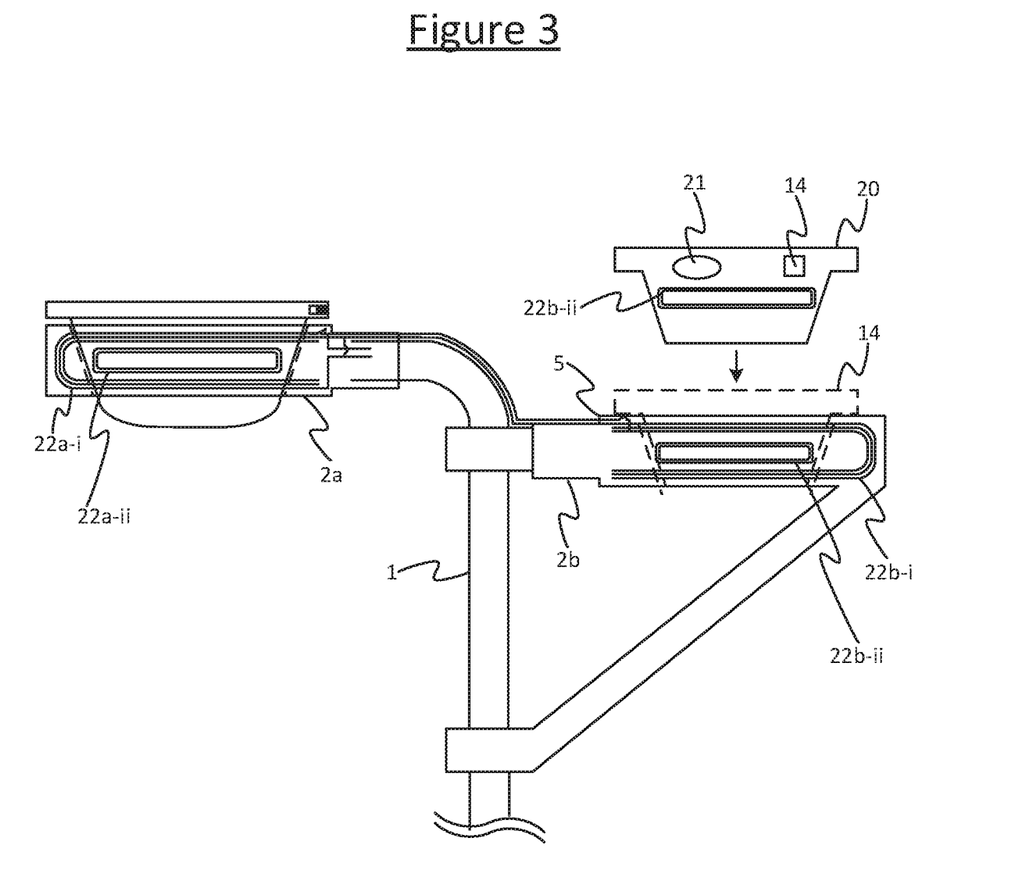
FIG. 3 is a schematic illustration of a light pole with a removable lighting module and separate removable receiver module.

Another possibility is illustrated in FIG. 3. Here the light pole head 2a comprises a first primary winding 22a-i and a first secondary winding 22a-ii arranged to power the illumination module 4 by inductive coupling as described above. However, in the case of FIG. 3, the controller 14 and its magnetic coupling circuitry 5 are housed together in another, separate module 20, separate to the illumination module 4; and the module-accepting part 2 of light pole 1 also comprises at least one second, additional section 2b in additional to part 2a that accepts the illumination module 4, for accepting at least this other module 14 (and potentially further modules as well, e.g. one or more sensor modules, not shown). The second accepting section 2b could be implemented in the head of the light pole 1, or elsewhere such as mounted on a separate arm as illustrated by way of example in FIG. 3.

Between them, the controller module 20 and the second accepting part 2b of the light pole 1 comprise second inductive coupling circuitry 22b, comprising a second primary winding (coil) 22b-i in the second accepting part 2b and a second secondary winding (coil) 22b-ii in the controller module 14. Like the first primary winding 22a-i, the second primary winding 22b-i is connected to the power supply 6, 7 of the light pole (e.g. the mains supply). Further, the second accepting part 2b of the light pole 1 comprises a second connector mechanism for receiving the controller module 20 (which includes the magnetic coupling circuity 5). The controller module 20 is arranged so that, when thus connected to the second accepting part 2b, the second secondary coil 22b-ii is positioned adjacent to the second primary coil 22b-i. Thus the controller 14 (including its magnetic coupling circuitry 5) is arranged to be powered by the power supply 6, 7 of the light pole 1 (e.g. the mains) via the inductive coupling between the second primary winding 22b-i and the second secondary winding 22b-ii.

In embodiments, the connection of the second primary winding 22b-i to the power supply 6, 7 may be via the same switch 9 that connects and disconnects the first primary winding 22a-i to the power supply 6, 7; such that when the switch 9 is switched, this turns on and off the power to the controller 14 and magnetic coupling circuitry 5 along with the power to the lamp 11. In this case again an alternative means of powering the controller 14 will be required when the switch 9 is switched off. Alternatively the second primary coil 22b-i may be arranged such that it is not connected and disconnected to the power supply 6, 7 by the switch 9 that switches the power to the first primary winding 22a-i, but instead the second primary coil 22b-i is permanently connected to the power supply 6,7, or is connected and disconnected from it by a separate switch (not shown).

Other arrangements are also possible. For example, in embodiments the controller 14 and lamp 11 are implemented in separate modules which have separate secondary coils 22a-ii, 22b-ii, but the connector in the light pole head 2 may be arranged such that both modules share the same primary coil 22i (i.e. both secondary coils 22a-ii, 22b-ii may be arranged to couple to the same primary coil 22i).

In further embodiments, the controller 14 does not necessarily control the power to the illumination module 4 (or does not only control the power to this module). For instance, the module 20 in which the controller 14 is housed may take the form of a sensor module comprising one or more sensors 21. E.g. the sensor(s) 21 may comprise one or more cameras, such as a security camera configured to capture still images or video footage of at least part of the surroundings of the light pole 1 in visible light and/or infrared. The camera could also be a 2D camera or a 3D (depth aware camera). Other examples of sensors 21 that could alternatively or additionally be included in the sensor module are: a presence sensor configured to detect presence of a person in certain region defined relative to the light pole 1, and/or a temperature sensor configured to detect the operating temperature of one or more components of the light pole 1 (e.g. a component of the illumination module 4 such as the lamp 11), and/or an ambient light sensor configured to detect the ambient light level of the environment of the light pole 1.

In such embodiments, the magnetic coupling circuity 5 may be configured to enable the controller 14 to control a switch 9 that toggles the power to the illumination module 4 (or not only to illumination module 4) but, but rather to the separate module 20 in which the controller 14 incorporated, e.g. the sensor module. In this case therefore, the controller 14 can control whether or not power is delivered to the one or more sensors via the inductive coupling between the secondary winding 22b-ii in the sensor module 20 and the primary winding 22i-b in the part 2b of the light pole that accepts the sensor module 20, in order to control the power to the one or more sensors 21.

In further variants of this, one or more sensors could even be included in a third module (not shown) and the controller module 20 may be configured to control the inductive deliverance of power from the light pole 1 to this module via the magnetic coupling circuitry 5, in a similar manner as described in relation to the illumination module 4 of FIG. 3. This could be in addition to or as an alternative to controlling the power to the illumination module 4.

Figure 4:
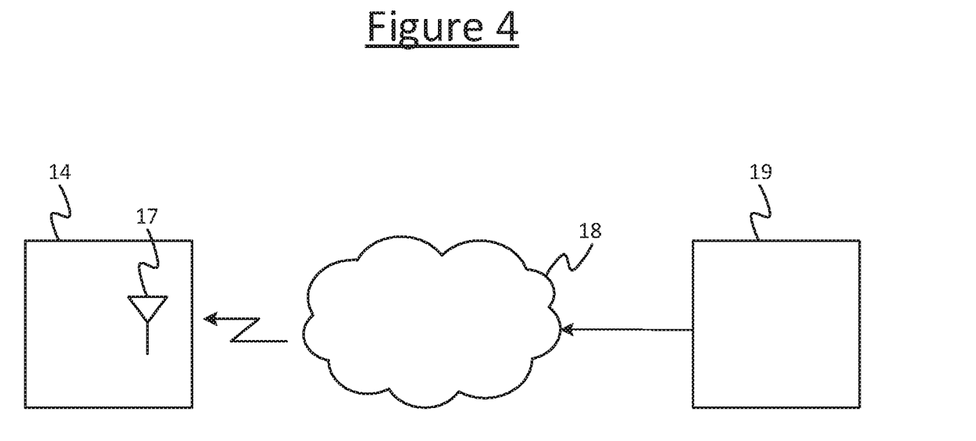
FIG. 4 is a schematic block diagram of a system for remotely controlling a light pole.

FIG. 4 shows the controller 14 in the context of a wider control system. The context illustrated in FIG. 4 may apply regardless of whether the controller 14 is implemented in the illumination module 4, or a sub-module of it, or in a separate module.

As illustrated, the controller 14 comprises a wireless receiver 17 for receiving wireless signals. This enables a central control system 19 to remotely instruct the controller 14 via one or more networks 18, e.g. via the Internet and a wireless connection between the Internet and the wireless receiver 17. The control system 19 may for example comprise a computer terminal or server running suitable lighting control software for managing one or more light poles. Note that a server herein may refer to one or more server units at one or more geographical sites.

For instance, the wireless receiver may be configured to connect to the Internet wirelessly via a mobile cellular network, e.g. a 3GPP network such as a GPRS, LTE or 4G network; or via a local wireless area network (WLAN) such as a Wi-Fi, ZigBee or Thread network; or via a dedicated wireless city management network. The central control system 19 may then send lighting control commands to the controller 14 via the Internet and the wireless network 18, instructing it to switch the light pole 1 on and off. The controller 14 is configured to receive these commands via the wireless receiver 17, and act on them by controlling the switch 9 via the magnetic coupling circuity 5 and the magnetic coupling 16 to the switch 9 as discussed above. Thus the power from the light pole's power supply 6, 7 to the lamp 11 is switched on and off remotely based on the wireless signals originating from the control system 19, thereby turning the illumination from the lamp 11 on and off.

In embodiments, the wireless receiver 17 may comprise a wireless transceiver so that the controller 14 can also send messages to the control system 19. For instance the controller 14 may comprise one or more sensors (not shown) such as an ambient light sensor, a camera, and/or a temperature sensor for measuring an operating temperature of the light pole 1 or illumination 4. In such cases the controller 14 may be configured to transmit the ambient light readings, captured images and/or temperature readings to the control system 19 (or indeed elsewhere) via the wireless transceiver 17 and network(s) 18.

The purpose of the switch 9 is to switch off the primary winding 22i in standby operation. As such, in embodiments where the power to the controller 14 is also turned off with the switch 9, then a mechanism will be required for powering the controller 14 when the switch is off. There are several possibilities for this.

For instance, in order to supply the controller 14 with auxiliary supply in standby mode, in embodiments a high impedance 8 (reactive impedance) is placed in parallel with the switch 9. This impedance 8 limits the reactive power consumption of the primary winding in standby operation. Because any addition of capacitors, semiconductors or any other lifetime sensitive parts could sacrifice the reliability of this part of the light pole 1, this unique approach is chosen. Once the light pole 1 transitions from standby operation to normal operation, the switch 9 that is in series with the primary winding 22i will be activated though the magnetic coupling 16 and will thus short circuit the high impedance 8. However, with this high impedance 8 in parallel with the switch 9, then when the switch is open a leakage current will flow which will still be sufficient to power the controller 14 (which only requires a very small amount of power). Preferably this impedance 8 takes the form of a capacitor. Switching off the primary winding 22i, means switching off the high power. When the switch 9 is not conducting, a small current will pass through the impedance 8 and cause a very small portion of power to be delivered through the primary winding 22i to the secondary winding 22ii. This power can used to power the controller 14 in standby mode (which draws a very low power compared to, say, a lamp), or this small power can be accumulated to operate the magnetic coupling circuitry 5 and thus the switch 9, or to perform a higher power requirement task such as sensing a message.

Alternatively or additionally, the illumination module 4 or controller module 20 may be equipped with a photovoltaic cell, kinetic energy harvesting device and/or another small transformer, which may be arranged to power the controller 14 (at least partially). For instance, the option of a kinetic energy harvesting device can work because the light pole 1 is typically 10 to 20 m high and so tends to or vibrate slightly. Light poles close to the ground appear to be static, but in fact there is vibration within the pole heads. E.g. wind, or air movement caused by passing trucks, combined with the length, mass and stiffness of the pole, result in vibration. The taller the pole, the more motion is to be expected within the pole head 2. Therefore with a kinetic energy harvester placed toward the top of light pole therefore in the same removable module as the controller 14, then enough power can be garnered to power this low-power controller 14.

In another example, a small battery may be included in the illumination module 4 or controller module 4, and this may be arranged to power the controller 14. In embodiments, the battery may be arranged to be charged by the leakage current from the impedance 8, or by the photo voltaic cell or kinetic energy harvesting means, or a combination of these. In yet further alternative or additional embodiments, the battery may be charged by the robot when the illumination module 4 or controller module 14 is installed or replaced.

According to everything discussed above, there has been disclosed a wireless interface between the illumination module (fixture) 4 and the light post 1 that simplifies the replacement of this lighting fixture. The switch 9 on the primary side is under the control of a circuit 5, 14 on the secondary side. In order to increase the possibility for exchange of the lighting fixture part 4 and/or controller module 20, it is preferable to have the intelligence on the secondary side in the part which is removable. For power saving it is necessary to cut the power at the primary side in such a way that no power is consumed when the lighting fixture is switched off.

Preferably, the system is designed such that whatever is placed on the light pole that does not require maintenance or replacement, should last for the lifetime of the light pole 1 itself. Passive wireless coupling, as proposed here, is perfectly suited for the power levels required for street lighting fixtures in the range 50-250 Watts. The wireless power transmitter, mounted to the light pole 1, comprises the primary winding 22*i*. The removable lighting fixture 4, which is the counter part of the transformer 22, will contain the secondary winding 22*ii*. Once the secondary winding 22*ii* is aligned with the primary winding, power can be transferred from the primary winding 22*i* to the secondary winding 22*ii*.

Without a switch-off mechanism 5, 9 of the primary winding 22*i*, the primary winding 22*i* would consume high reactive power in standby operation. In many countries the lighting system is part of the consumer power-grid, so this high reactive load is unwanted and in some countries not even allowed when deployed on large scale. To avoid this reactive impedance on the grid, the primary winding 22*i* is equipped with the above-described switch 9. In embodiments this may take the form of a reed relay, but any other switch mechanism is also possible (e.g. such as a mag-amp). Preferably the switch mechanism 9 is chosen to have an expected lifetime at least as long as a reed switch.

In embodiments, other IoT devices such as sensors can make use of the same wireless power interface. If such a wireless power interface is standardized as well, it could become a long lasting hub on light poles that supports and supplies a large variety of present and future devices on a light pole. Variants of the present invention could also be realized with an active wireless power transmitter and may exploit all the advantages of high frequency wireless power transmission.

It will be appreciated that the above embodiments have been described by way of example only. More generally, the teachings above can be extended to any lighting device with a removable part wherein the intelligence is in the removable part and the energy transfer is made by induction, characterized in that a switch on the primary side is under the control of the intelligence in the secondary side. The device can be a lighting fixture or an accessory of a lighting fixture (e.g. sensor, camera, or other).

Furthermore, in embodiments the teachings herein can be extended to other structures affixed to the ground, such as signposts. In this case a power supply of the signpost, or the like, can be used to transfer power from a primary winding in the signpost to a secondary winding in a module attached to the signpost, e.g. a sensor module such a camera; whilst magnetic coupling circuitry in the module (or another module) can be used to switch on and off the power supply of the signpost.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus comprising:
    a pole affixed to the ground, comprising a module-mounting part; and
    one or more removable modules adapted to be removably fitted to the module-mounting part of the pole;
    wherein the module-mounting part of the pole comprises at least one primary winding of an inductive coupling circuit, the primary winding being connected to a power supply via a switch;
    wherein at least one of the removable modules comprises a secondary winding of the inductive coupling circuit, the secondary winding sharing a substantially same flux than the primary winding when said at least one removable module is in place in the module-mounting part;
    wherein the apparatus further comprises, included in one of the one or more removable modules, a controller comprising a wireless receiver for wirelessly receiving on-off signals from a remote control system; and
    wherein the controller further comprises magnetic coupling circuitry arranged so as when fitted to the module-mounting part of the pole to form a magnetic coupling with the switch and to thereby switch the switch on and off in accordance with the on-off signals.

2. The apparatus of claim 1, wherein the controller is arranged to be powered at least in part by the power supply of the pole via the inductive coupling circuitry.

3. The apparatus of claim 1, wherein said pole is a light pole; and wherein said at least one removable module comprises a lighting module comprising an illumination source for emitting illumination to illuminate at least part of an environment of the light pole, and the secondary winding being connected to the illumination source such that said inductive coupling powers the illumination source to emit said illumination.

4. The apparatus of claim 3, wherein the controller is implemented as a removable and replaceable module adapted to fit to the lighting module, being removable and replaceable while the lighting module remains fitted to the pole.

5. The apparatus of claim 3, wherein the controller is arranged to be powered to perform said receiving and switching at least in part by the same inductive coupling between the same primary winding and the same secondary winding which powers the illumination source.

6. The apparatus of claim 3, wherein: the one or more removable modules are a plurality of removable modules, and the controller is implemented in a separate one of the plurality of removable modules other than the lighting module.

7. The apparatus of claim 6, wherein the second secondary winding is incorporated in said separate module.

8. The apparatus of claim 3, wherein:
    the inductive coupling circuitry comprises a plurality of secondary windings, with the secondary winding that transfers the power said illumination source being a first of said plurality of secondary windings, and the module in which the controller is implemented comprising a second of said secondary windings;
    the inductive coupling circuitry comprises one or more primary windings including at least the primary winding that transfers the power to said illumination source; and
    the controller is arranged to be powered to perform said receiving and switching at least in part by an inductive coupling between one of the one or more primary windings and the second secondary windings.

9. The apparatus of claim 8, wherein:
    the one or more primary windings are a plurality of primary windings, with the primary winding used to power said illumination source being a first of the plurality of primary windings, and the plurality of primary windings further comprising a second primary winding; and the controller is arranged to be powered to perform said receiving and switching at least in part by an inductive coupling between the second primary winding and the second secondary winding.

10. The apparatus of claim 9, wherein the second primary winding is not disconnected from the power supply of the pole by said switch being switched off, such that the controller is arranged to be powered to perform said receiving and switching when the switch is switched off at least in part by the power supply of the pole via the inductive coupling between the second primary winding and the second secondary winding.

11. The apparatus of claim 10, wherein:

the module-mounting part of the pole comprises an additional switch connecting the second primary winding to the power supply of the pole, such that the controller is isolated from the power supply of the pole by the additional switch being switched off;

the module in which the controller is implemented comprises further magnetic coupling circuitry arranged so as when fitted to the module-mounting part of the pole to form a magnetically coupling to the additional switch;

the module in which the controller is implemented comprises a battery arranged to be charged by the power supply of the pole via the inductive coupling between the second primary coil and the second secondary winding when the additional switch is switched on, with the controller being configured to be powered to perform said receiving and switching at least in part by the battery when the additional switch is switched off;

the module in which the controller is implemented comprises a battery level meter arranged to measure a battery level of the battery; and the controller comprises logic configured to operate the further magnetic coupling circuitry to automatically switch the additional switch on to charge the battery when the detected battery level is detected to be below a threshold, and to automatically switch the additional switch off when the detected battery level is above a threshold.

12. The apparatus of claim 9, wherein the second primary winding is also connected to the power supply of the pole via said switch, such that the controller is isolated from the power supply of the pole by the switch being switched off.

13. The apparatus of claim 1, wherein said at least one module comprises a sensor module comprising a sensor, and the secondary winding being connected to the sensor such that said inductive coupling powers the sensor.

14. The apparatus of claim 1, wherein one or more of:

the pole comprises an impedance connected in parallel with the switch, and the controller being arranged to be powered to perform said receiving and switching when the switch is switched off at least in part by a leakage current due to the impedance;

the module in which the controller is implemented comprises a battery arranged to be charged by the power supply of the pole via the inductive coupling circuitry when the switch is switched on, with the controller being arranged to be powered to perform said receiving and switching at least in part by the battery when the switch is switched off; and/or the module in which the controller is implemented comprises one or more photovoltaic cells, with the controller being arranged to be powered to perform said receiving and switching at least in part by the one or more photovoltaic cells when the switch is switched off; and/or the module in which the controller is implemented comprises a kinetic energy harvesting device, and the controller is arranged to be powered to perform said receiving and switching at least in part by the kinetic energy harvesting device when the switch is switched off.

* * * * *